May 30, 1950            A. BURRIS            2,509,905

POROSITY TESTER

Filed Dec. 11, 1945

INVENTOR
ALBERT BURRIS

BY

ATTORNEY

Patented May 30, 1950

2,509,905

UNITED STATES PATENT OFFICE 2,509,905

POROSITY TESTER

Albert Burris, St. Marys, Pa., assignor to the United States of America as represented by the Secretary of the Navy Application December 11, 1945, Serial No. 634,290

4 Claims. (Cl. 73—38)

This invention relates generally to testing apparatus for mercury switches of the type disclosed in the copending patent application of Samuel M. Darr, Serial No. 617,366, filed in the United States Patent Office on September 19, 1945, entitled "Centrifugal switch" and assigned to the same assignee as the present invention and more particularly to a flow tester for the flow retarding means of such switches, such as the molded nickel cup components disclosed in the aforementioned application.

The purpose of the invention is to ascertain the porosity of said cups, during their process of manufacture and while they are in a green state (i. e. before sintering) by utilizing a gas (air) flow through a portion of each cup to indicate its porosity and thus supply information concerning its probable mercury flow characteristics when the finished cup subsequently becomes an operative part of a mercury switch.

Figure 1:
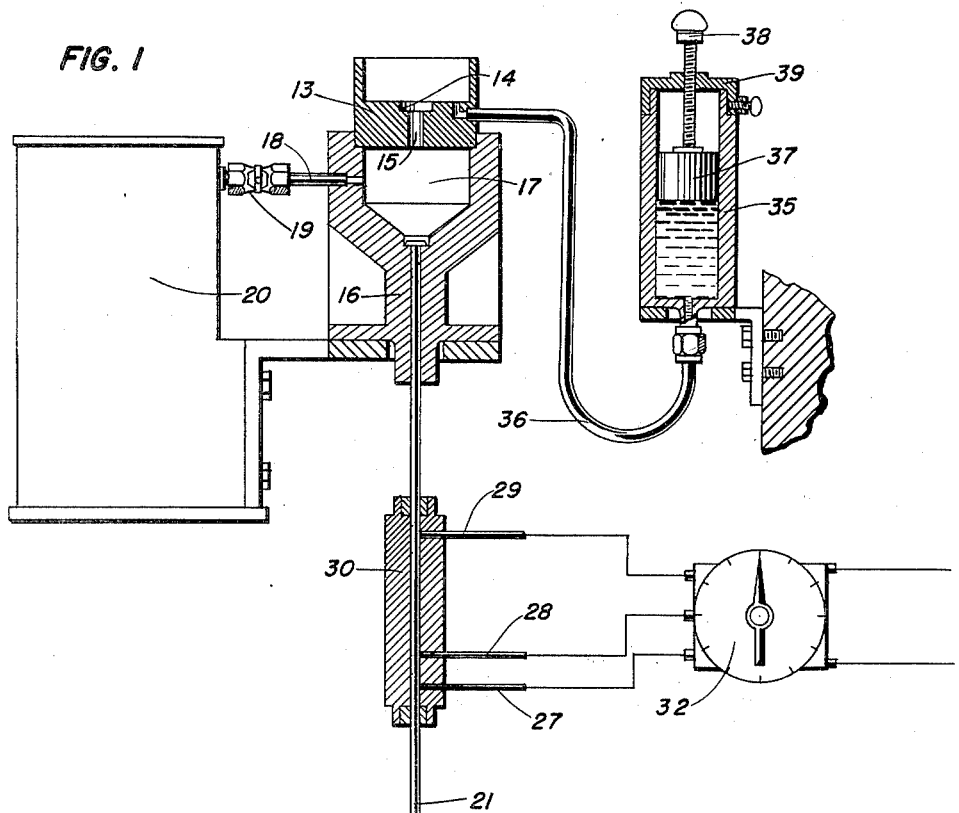
Fig. 1 is an elevational section view of a testing device in accordance with the invention.

In the drawing there is illustrated a device for testing the air flow rate of a molded nickel cup 11 of cylindrical shape, and provided with an end wall 12.

Figure 2:
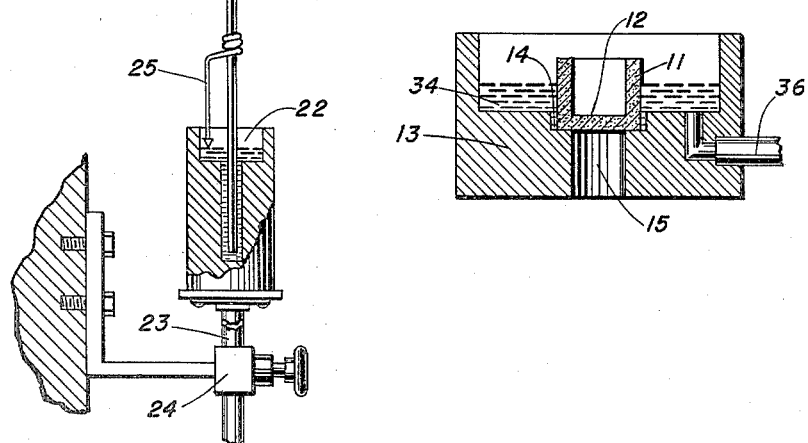
Fig. 2 is an enlarged elevational sectional view of the cup-holder of the Fig. 1 embodiment and a cup under test.

The cup under test is inserted, as in Fig. 2, in a steel holder 13, fashioned with a depression 14 that forms a seat for the cup under test. The seat has a depth greater than the thickness of the end wall 12, and the seat opens into a vent port 15, both the seat and port being closed by cup end wall 12.

The vented holder 13 is supported in a base 16 which is so formed as to provide a rarefied air chamber 17 open to vent port 15, and an air pipe 18 and control valve or stopcock 19, connect the air chamber with a reduced pressure air reservoir 20.

By opening control valve 19 to establish communication with reservoir 20 the air pressure in chamber 17 may be reduced below atmospheric pressure.

The lower conical end of air chamber 17 communicates through a glass tube 21 which, as shown, comprises two sections, connected by a holder 30, with an open mercury reservoir 22, which supplies a column of mercury that rises and falls in the tube. This reservoir is supported on a post 23, slidably adjustable in bracket 24.

An adjustable pointer or indicator 25 is frictionally mounted on the glass tube to project down into the reservoir, as an expedient indicating a predetermined level of mercury to be maintained in the reservoir while testing the cups.

Three spaced wires or electrodes 27, 28 and 29 are mounted in the tubular holder 30, that connects adjoining tube sections, and these electrodes are included in the control circuit of a suitable elapsed-interval electric timer 32. The operation of the timer is determined by the depression of the mercury column and the circuits are so arranged in a manner well known to those skilled in the electrical art that the timing period starts as the mercury level recedes from and breaks contact with electrode 29 and ends when the level of the column recedes from and breaks contact with electrode 28. For example, opening contact 29 may cause the removal of a short-circuit across the supply voltage to the clock and opening contact 28 can be the opening of the supply voltage circuit.

As indicated in Fig. 2, in order to confine and localize the air flow through porous cup end wall 12, a fluent seal in the form of an annular mercury jacket 34 is provided between end wall of the cup and the surrounding wall of holder 13. This jacket of mercury closes and seals the pores of the exterior surface of the cylindrical wall at the closed end of the cup, thereby confining the flow of air to a path through the end wall 12. Mercury for sealing these pores is supplied under pressure from a closed reservoir 35, through a pipe 36, and the mercury in reservoir 35 is placed under the required pressure by means of a piston 37, depressed by a hand screw 38 mounted in the reservoir cover 39.

As shown in Fig. 2, the cup to be tested is placed in holder 13, closing the port 15 to the chamber 17; and mercury is supplied from reservoir 35 to form a seal 34 in the holder about the lower cylindrical portion of the cup.

Control valve 19 is now opened to establish communication between reservoir 20 and chamber 17, thereby reducing the air pressure in chamber 17 below atmospheric pressure, with the result that a column of mercury rises from reservoir 22 through sectional tube 21 and passes the uppermost electrode 29.

Control valve 19 is now closed, and the rarefied condition of air in chamber 17 induces a flow of air through the porous end wall 12 and port 15 into the air chamber 17, since the interior of the cup under test is at atmospheric pressure.

Under the equalizing influence of atmospheric pressure, caused by this air flow into chamber 17, the mercury column in tube 21 now falls, and the rate of flow of air through the cup is measured by the electrically timed fall of the mercury level in tube 21 from the level of electrode 29 to that of electrode 28 as previously explained.

In this manner the timing of the mercury flow is utilized with the corresponding flow of air through the end wall 12 of the cup 11, to indicate the flow characteristics of the cup when subsequently employed in a mercury switch.

This testing apparatus has proven very sensitive to any change in the flow characteristics of the green metal cups as they come from the press, and any variations or trends in the porosity of the cups can be immediately detected through the action of the mercury column and timer and the results may be indicated by the electrical testing equipment.

While there has been shown what is at present considered to be the preferred embodiment of the present invention it will be obvious to those skilled in the art that various changes and modifications may be made therein without departing from the invention and it is accordingly to be understood that the invention is defined solely in and by the following.

What is claimed is:

1. In a flow tester for porous cups of mercury switches, the combination of a base having an air chamber, a holder to receive a cup to be tested and having a bottom on which said cup stands, said bottom having therein an opening smaller than the bottom of said cup, and in communication with said air chamber, said cup cooperating therewith in closing said chamber, means for exhausting air from said chamber, a mercury tube communicating with the chamber, and means operable by recession of mercury in the tube induced by air flow through said cup for timing said recession, whereby the porosity of said cup may be determined.

2. In an apparatus for testing porous cups of mercury switches, the combination of a base having a rarefied air chamber, a holder to receive a cup to be tested, said holder having an opening closable by said cup and affording communication between the bottom of the cup and the chamber, said cup and holder jointly forming a closure for said chamber, a fluent medium in said holder providing a hermetic seal between the cup and the holder, a mercury tube communicating with said chamber, and means operable by the recession of mercury in said tube induced by air flow through said cup for timing said recession, whereby the porosity of said cup may be determined.

3. A testing device for measuring the rate of gas flow through a porous sample comprising means for producing an air-pressure differential between opposite sides of said sample, fluent conductor means subjected to said differential to be displaced from a reference position in response to said differential and to be restored to said reference position when said differential is eliminated, said differential being eliminated by the resulting flow of gas through said porous sample, and means for measuring the time of said restoration, thereby to measure the porosity of said sample.

4. In a flow tester for porous elements of mercury switches, in combination, a base having a chamber therein containing a gas at subatmospheric pressure, a holder for the element to be tested, said holder having an opening therein in communication with said chamber, and closable by the bottom of said element under test when placed in the holder, means providing a hermetic seal between the holder and the said element, and means for indicating the rate of flow of the gas through said bottom.

ALBERT BURRIS.

REFERENCES CITED

The following references are of record in the file of this patent:

UNITED STATES PATENTS

| Number | Name | Date |
| --- | --- | --- |
| 1,827,562 | Carpenter | Oct. 13, 1931 |
| 2,021,948 | Schopper | Nov. 26, 1935 |